US012325766B2

(12) United States Patent
Tanaka

(10) Patent No.: US 12,325,766 B2
(45) Date of Patent: Jun. 10, 2025

(54) FINE RESIN PARTICLES AND METHOD FOR PRODUCING THE SAME

(71) Applicant: SEKISUI KASEI CO., LTD., Osaka (JP)

(72) Inventor: Kohei Tanaka, Shiga (JP)

(73) Assignee: SEKISUI KASEI CO., LTD., Osaka (JP)

( * ) Notice: Subject to any disclaimer, the term of this patent is extended or adjusted under 35 U.S.C. 154(b) by 206 days.

(21) Appl. No.: 17/635,818

(22) PCT Filed: Aug. 25, 2020

(86) PCT No.: PCT/JP2020/032051
§ 371 (c)(1),
(2) Date: Feb. 16, 2022

(87) PCT Pub. No.: WO2021/039798
PCT Pub. Date: Mar. 4, 2021

(65) Prior Publication Data
US 2022/0306784 A1    Sep. 29, 2022

(30) Foreign Application Priority Data

Aug. 28, 2019  (JP) ................................ 2019-156171
Jan. 24, 2020  (JP) ................................ 2020-010139

(51) Int. Cl.
| | | |
|---|---|---|
| C08F 220/14 | (2006.01) |
| C08F 2/00 | (2006.01) |
| C08F 2/30 | (2006.01) |
| C08F 212/08 | (2006.01) |
| C08F 222/10 | (2006.01) |
| C08J 3/12 | (2006.01) |

(52) U.S. Cl.
CPC ............ *C08F 220/14* (2013.01); *C08F 2/001* (2013.01); *C08F 2/30* (2013.01); *C08F 212/08* (2013.01); *C08F 222/102* (2020.02); *C08J 3/122* (2013.01)

(58) Field of Classification Search
None
See application file for complete search history.

(56) References Cited

U.S. PATENT DOCUMENTS

| | | | |
|---|---|---|---|
| 5,348,998 A | 9/1994 | Ito et al. | |
| 2015/0376390 A1* | 12/2015 | Kosugi | C08L 33/08 524/233 |
| 2017/0152393 A1 | 6/2017 | Matsumoto | |
| 2018/0273696 A1* | 9/2018 | Goto | C08F 2/26 |

FOREIGN PATENT DOCUMENTS

| | | |
|---|---|---|
| JP | 9-278837 | 10/1997 |
| JP | 10-254171 | 9/1998 |
| JP | 2881749 | 2/1999 |
| JP | 2000-290330 | 10/2000 |
| JP | 2004-331845 | 11/2004 |
| JP | 3742154 | 2/2006 |
| JP | 2010-77243 | 4/2010 |
| JP | 2011137096 A  * | 7/2011 |
| JP | 2012-62388 | 3/2012 |
| JP | 2013-203986 | 10/2013 |
| JP | 2013-204114 | 10/2013 |
| JP | 2013-231133 | 11/2013 |
| JP | 2016-27151 | 2/2016 |
| JP | 2017-119737 | 7/2017 |
| JP | 6258740 | 1/2018 |

OTHER PUBLICATIONS

Machine translation JP-2011137096-A (Year: 2024).*
International Search Report issued Nov. 17, 2020 in International (PCT) Application No. PCT/JP2020/032051, 4 pages.
Office Action issued Jul. 3, 2023 in corresponding Korean Patent Application No. 10-2022-7001868, with English translation.
Extended European Search Report issued in corresponding European Patent Application No. 20858310.4.

* cited by examiner

*Primary Examiner* — Alexandre F Ferre
(74) *Attorney, Agent, or Firm* — Wenderoth, Lind & Ponack, L.L.P.

(57) ABSTRACT

An object is to provide fine resin particles that have solvent resistance sufficient to withstand a heating step after solvent dispersion and that generate few bubbles during dispersion and have high dispersibility in a solvent, and a method for producing the fine resin particles. As a solution, fine resin particles obtained by polymerizing a vinyl monomer, the fine resin particles having a gel fraction of 93% or more and a solvent resistance index of 50 or less, and fine resin particles obtained by polymerizing a vinyl monomer, in which the vinyl monomer contains a reactive surfactant having a polyoxyalkylene chain in a molecule thereof, and a vinyl polymer chain of the fine resin particles is terminated with a hydroxy group derived from a polymerization initiator, are provided.

12 Claims, No Drawings

FINE RESIN PARTICLES AND METHOD FOR PRODUCING THE SAME

TECHNICAL FIELD

The present invention relates to fine resin particles and a method for producing the fine resin particles.

BACKGROUND ART

Methods for producing fine resin particles include suspension polymerization, seed polymerization, emulsion polymerization, soap-free polymerization, and dispersion polymerization. Emulsion polymerization is suitable particularly for the production of fine resin particles with very small particle sizes such as submicron sizes, and the fine particles obtained are used in a wide variety of applications such as antiblocking agents for light diffusion plates and various films, various film modifiers, spacers between very small parts of various electronic devices, pore-forming agents for various battery members, and core particles of conductive fine particles providing electrical connection. Particularly for use in the field of optics, it is necessary to take into consideration the influence on optical properties such as haze and light transmittance, and therefore fine resin particles obtained by polymerizing a (meth)acrylic monomer, a styrene monomer, or the like as a particle composition have been suitably used. In this case, for example, the particles are used in the form of a dispersion in a solvent or directly kneaded with a resin raw material. In general, cross-linked fine particles are highly resistant to solvents, heat, etc. and suitable for use. An example of the production of cross-linked fine particles is, for example, PTL 1.

CITATION LIST

Patent Literature

PTL 1: Japanese Patent No. 3742154
PTL 2: Japanese Patent No. 6258740

SUMMARY OF INVENTION

Technical Problem

However, cross-linked fine particles with some degree of cross-linking have low solvent resistance, and when a heating step or the like is additionally performed after solvent dispersion, the particles swell, resulting in problems such as not having a desired particle size at the point of use. PTL 2 discloses particles that maintain solvent resistance and are obtained by a productive method, but the method uses a non-reactive surfactant at the time of emulsion polymerization. If particles obtained by the method described in PTL 2 are dried and used as they are, a free residual surfactant will be present in a solvent or a resin, and foaming will occur during dispersion, thus causing, for example, aggregation and sedimentation of the particles and separation of the particles from a substrate. Although the surfactant can be removed by washing or the like, the number of steps increases, which is not preferred in terms of production.

The present invention has been made in view of the foregoing problems, and an object thereof is to provide fine resin particles that have solvent resistance sufficient to withstand a heating step after solvent dispersion and that generate few bubbles during dispersion and have high dispersibility in a solvent, and a method for producing the fine resin particles.

Solution to Problem

The present inventors have conducted intensive studies and found that the above-described problems can be solved by using specific fine resin particles. The present invention include the following aspects.

[1] Fine resin particles obtained by polymerizing a vinyl monomer, the fine resin particles having a gel fraction of 93% or more and a solvent resistance index of 50 or less.
[2] Fine resin particles obtained by polymerizing a vinyl monomer, in which the vinyl monomer contains a reactive surfactant having a polyoxyalkylene chain in a molecule thereof, and a vinyl polymer chain of the fine resin particles is terminated with a hydroxy group derived from a polymerization initiator.
[3] The fine resin particles according to [2], having a gel fraction of 93% or more and a solvent resistance index of 50 or less.
[4] The fine resin particles according to any one of [1] to [3], having a volume-average particle size of 10 to 1000 nm.
[5] The fine resin particles according to any one of [1] to [4], having a volume-average particle size whose coefficient of variation is 25% or less.
[6] The fine resin particles according to any one of [1] to [5], in which an amount of residual surfactant is 0.01 to 1 part by mass relative to 100 parts by mass of the fine resin particles.
[7] The fine resin particles according to any one of [1] to [6], in which the vinyl monomer includes a monofunctional (meth)acrylic monomer and/or a monofunctional aromatic vinyl monomer.
[8] The fine resin particles according to any one of [1] to [7], in which the vinyl monomer includes a polyfunctional (meth)acrylic monomer and/or a polyfunctional aromatic vinyl monomer.
[9] A method for producing fine resin particles, including a first polymerization step of polymerizing a monomer emulsion containing a vinyl monomer, an aqueous medium, and a reactive surfactant having a polyoxyalkylene chain in a molecule thereof by using a water-soluble polymerization initiator to obtain seed particles, and a second polymerization step of allowing the seed particles to absorb another monomer emulsion containing a vinyl monomer, an aqueous medium, and a reactive surfactant having a polyoxyalkylene chain in a molecule thereof and then polymerizing the other monomer emulsion.
[10] The method for producing fine resin particles according to [9], in which the vinyl monomers each include at least one selected from monofunctional (meth)acrylic monomers, monofunctional aromatic vinyl monomers, polyfunctional (meth)acrylic monomers, and polyfunctional aromatic vinyl monomers.
[11] The method for producing fine resin particles according to [9] or [10], including a spray-drying step of spray drying the fine resin particles obtained in the second polymerization step under conditions of an inlet temperature of 80° C. to 220° C. and an outlet temperature of 50° C. to 100° C. to obtain an aggregate.
[12] The method for producing fine resin particles according to [11], including a disintegration step of disintegrating the aggregate to disperse the fine resin particles.

[13] The method for producing fine resin particles according to any one of [9] to [12], including a classification step of classifying the fine resin particles.
[14] The fine resin particles according to any one of [1] to [8], being used as an antiblocking agent for a resin film.
[15] The fine resin particles according to any one of [1] to [8], being used as an additive for a light diffusion plate.
[16] The fine resin particles according to any one of [1] to [8], being used as a spacer for an electronic device.

Advantageous Effects of Invention

The present invention provides fine resin particles that have solvent resistance sufficient to withstand a heating step after solvent dispersion and that generate few bubbles during dispersion and have high dispersibility in a solvent, and a method for producing the fine resin particles.

The fine resin particles of the present invention are particles that are less likely to swell if heated in a state of being dispersed in a solvent and show little variation in particle size. In addition, since the amount of free surfactant is small, the fine resin particles require no washing step and are produced with high productivity.

DESCRIPTION OF EMBODIMENTS

Hereinafter, the present invention will be described in detail.
[Fine Resin Particles]

Fine resin particles of the present invention are fine resin particles obtained by polymerizing a vinyl monomer and having a gel fraction of 93% or more and a solvent resistance index of 50 or less. The fine resin particles of the present invention are also fine resin particles obtained by polymerizing a vinyl monomer, in which the vinyl monomer contains a monofunctional vinyl monomer, a polyfunctional vinyl monomer, and a reactive surfactant having a polyoxyalkylene chain in a molecule thereof, and a vinyl polymer chain of the fine resin particles is terminated with a hydroxy group.
<Vinyl Monomer>

The fine resin particles of the present invention are obtained by polymerizing a vinyl monomer.

The vinyl monomer in the present invention is at least one selected from a monofunctional vinyl monomer having one vinyl group in one molecule and a polyfunctional vinyl monomer having two or more vinyl groups in one molecule.

Examples of the monofunctional vinyl monomer include a monofunctional (meth)acrylic monomer and a monofunctional aromatic vinyl monomer.

Examples of the polyfunctional vinyl monomer include a polyfunctional (meth)acrylic monomer and a polyfunctional aromatic vinyl monomer.

As used herein, "(meth)acrylic" refers to acrylic or methacrylic, and "(meth)acrylate" refers to acrylate or methacrylate.

Examples of the monofunctional (meth)acrylic monomer include (meth)acrylic acid alkyl esters in which the number of carbon atoms of an alkyl group bonded to an ester moiety is 1 to 20, such as methyl (meth)acrylate (methyl methacrylate and methyl acrylate), ethyl (meth)acrylate, propyl (meth)acrylate, isopropyl (meth)acrylate, n-butyl (meth) acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, isostearyl (meth)acrylate, nonadecyl (meth)acrylate, and eicosyl (meth)acrylate; and (meth)acrylate esters having an alicyclic structure in an ester moiety, such as cyclohexyl (meth)acrylate, isobornyl (meth)acrylate, and dicyclopentanyl (meth)acrylate.

Of these, methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, and decyl (meth)acrylate, in each of which the number of carbon atoms of an alkyl group bonded to an ester moiety is 1 to 10, are versatile and preferred, and particularly in applications where heat resistance is required, cyclohexyl (meth)acrylate, isobornyl (meth)acrylate, and dicyclopentanyl (meth)acrylate are preferred. These (meth)acrylic acid alkyl esters may be used alone or in combination of two or more.

Examples of the monofunctional aromatic vinyl monomer include styrene, o-methylstyrene, m-methylstyrene, p-methylstyrene, α-methylstyrene, t-butylstyrene, vinylnaphthalene, styrenesulfonic acid, styrenesulfonate salts (e.g., sodium styrenesulfonate and ammonium styrenesulfonate), vinylbenzoic acid, and hydroxystyrene. Of these, styrene, α-methylstyrene, and sodium styrenesulfonate are preferred. These monofunctional aromatic vinyl monomers may be used alone or in combination of two or more.

Examples of the polyfunctional (meth)acrylic monomer include ethylene glycol di(meth)acrylate, diethylene glycol di(meth)acrylate, triethylene glycol di(meth)acrylate, decaethylene glycol di(meth)acrylate, pentadecaethylene glycol di(meth)acrylate, pentacontahectaethylene glycol di(meth) acrylate, 1,3-butylene di(meth)acrylate, allyl (meth)acrylate (allyl methacrylate and allyl acrylate), trimethylolpropane tri(meth)acrylate, and pentaerythritol tetraacrylate. Of these, ethylene glycol di(meth)acrylate (ethylene glycol dimethacrylate) and allyl (meth)acrylate (allyl methacrylate) are preferred. These polyfunctional (meth)acrylic monomers may be used alone or in combination of two or more.

Examples of the polyfunctional aromatic vinyl monomer include divinylbenzene and divinylnaphthalene. These polyfunctional aromatic vinyl monomers may be used alone or in combination of two or more.

The mass ratio of the monofunctional vinyl monomer to the polyfunctional vinyl monomer in the vinyl monomer, that is, monofunctional vinyl monomer/polyfunctional vinyl monomer, may be preferably 1/30 to 30/1, more preferably 1/20 to 20/1, still more preferably 1/10 to 10/1.

The content of the monofunctional (meth)acrylic monomer in the vinyl monomer may be preferably 2 to 95 mass %, more preferably 5 to 90 mass %, still more preferably 10 to 85 mass %.

The content of the monofunctional aromatic vinyl monomer in the vinyl monomer may be preferably 0 to 25 mass %, more preferably 0 to 20 mass %, still more preferably 0 to 18 mass %.

The mass ratio of the monofunctional aromatic vinyl monomer to the monofunctional (meth)acrylic monomer in the monofunctional vinyl monomer, that is, monofunctional aromatic vinyl monomer/monofunctional (meth)acrylic monomer, may be preferably 0 to 1, more preferably 0 to 0.5, still more preferably 0 to 0.25.

The content of the polyfunctional (meth)acrylic monomer in the vinyl monomer may be preferably 0.4 to 98 mass %, more preferably 0.5 to 95 mass %, still more preferably 0.5 to 91 mass %.

The content of the polyfunctional aromatic vinyl monomer in the vinyl monomer may be preferably 0 to 30 mass %, more preferably 0 to 20 mass %, still more preferably 0 to 15 mass %.

The mass ratio of the polyfunctional aromatic vinyl monomer to the polyfunctional (meth)acrylic monomer in the polyfunctional vinyl monomer, that is, polyfunctional aromatic vinyl monomer/polyfunctional (meth)acrylic monomer, may be preferably 0 to 33, more preferably 0 to 30, still more preferably 0 to 28.

For example, the above values may be as follows: monofunctional vinyl monomer/polyfunctional vinyl monomer is 2/1 to 8/1, the content of the monofunctional (meth)acrylic monomer in the vinyl monomer is 60 to 85 mass %, the content of the monofunctional aromatic vinyl monomer in the vinyl monomer is 1 to 18 mass %, monofunctional aromatic vinyl monomer/monofunctional (meth)acrylic monomer is 0.005 to 0.25, the content of the polyfunctional (meth)acrylic monomer in the vinyl monomer is 0.3 to 30 mass %, the content of the polyfunctional aromatic vinyl monomer in the vinyl monomer is 0 to 8 mass %, and polyfunctional aromatic vinyl monomer/polyfunctional (meth)acrylic monomer is 0 to 30.

Alternatively, for example, the above values may be as follows: monofunctional vinyl monomer/polyfunctional vinyl monomer is 1/20 to 4/1, the content of the monofunctional (meth)acrylic monomer in the vinyl monomer is 5 to 15 mass %, the content of the monofunctional aromatic vinyl monomer in the vinyl monomer is 0 to 5 mass %, monofunctional aromatic vinyl monomer/monofunctional (meth) acrylic monomer is 0 to 0.05, the content of the polyfunctional (meth)acrylic monomer in the vinyl monomer is 85 to 98 mass %, the content of the polyfunctional aromatic vinyl monomer in the vinyl monomer is 0 to 5 mass %, and polyfunctional aromatic vinyl monomer/polyfunctional (meth)acrylic monomer is 0 to 5.

As the vinyl monomer, not only the above-described monomers but also unsaturated carboxylic acid monomers such as (meth)acrylic acid, hydroxyalkyl (meth)acrylate monomers such as hydroxyethyl (meth)acrylate, (meth) acrylamide monomers, (meth)acrylonitrile monomers, vinyl halide monomers such as vinyl chloride, vinyl carboxylate monomers such as vinyl acetate, olefin monomers such as ethylene, unsaturated imide monomers, vinyl alcohol, and the like can be used.

<Gel Fraction>

The fine resin particles of the present invention may have a gel fraction of 93% or more, preferably 95% or more, more preferably 96% or more.

The gel fraction of the fine resin particles of the present invention means the proportion of cross-linked portions that are present in the fine resin particles and exhibit solvent insolubility.

When the gel fraction is 93% or more, the fine resin particles can be stably dispersed in an organic solvent such as toluene. If heated after this, the fine resin particles will not be dissolved.

<Solvent Resistance Index>

The fine resin particles of the present invention may have a solvent resistance index of 50 or less, preferably 25 or less, more preferably 10 or less. The lower limit of the solvent resistance index is not particularly limited.

The solvent resistance index of the fine resin particles in the present invention is determined by the following measurement method.

—Method of Measuring Solvent Resistance Index—

One part by mass of the fine resin particles and 50 parts by mass of toluene are placed in a 100 mL plastic container with a lid and stirred with a deaeration stirrer (manufactured by THINKY CORPORATION, planetary centrifugal mixer (atmospheric-pressure type) AR-100 (trade name: Awatori Rentaro AR-100 (THINKY MIXER (Non Vacuum) AR-100))) for 3 minutes, and "volume-average particle size of fine resin particles" is measured with a dynamic light scattering-based concentrated nanoparticle size distribution analyzer (manufactured by CORDOUAN Technologies, "VASCO"). The resulting fine resin particle dispersion in toluene is then placed in a glass flask equipped with a reflux condenser, refluxed at 130° C. for 24 hours, and cooled. For the resulting fine resin particle dispersion in toluene after heating, "volume-average particle size of fine resin particles after heating" is measured with the above particle size distribution analyzer, and a solvent resistance index is calculated by the following formula.

$$\text{Solvent resistance index (\%)} = 100 \times (\text{volume-average particle size (nm) of fine resin particles after heating} - \text{volume-average particle size (nm) of fine resin particles})/\text{volume-average particle size (nm) of fine resin particles}$$

<Reactive Surfactant>

The fine resin particles of the present invention may be obtained by polymerizing a vinyl monomer containing a reactive surfactant having a polyoxyalkylene chain in a molecule thereof.

The reactive surfactant having a polyoxyalkylene chain in a molecule thereof is a surfactant having, in a molecule thereof, a double bond that allows copolymerization with a monomer in a polymerization system and a polyoxyalkylene chain which is a polymer of oxyalkylene. When such a reactive surfactant is used, the surfactant is not detached from the surface of the fine resin particles, and the mechanical stability of the fine resin particles can be enhanced. If the amount thereof is reduced, polymerization can be carried out without impairing the polymerization stability.

Examples of monomers constituting the polyoxyalkylene chain include oxyalkylenes such as ethylene oxide, propylene oxide, and butylene oxide. The reactive surfactant having a polyoxyalkylene chain may be used alone, or two or more reactive surfactants having a polyoxyalkylene chain may be used in combination.

Examples of the reactive surfactant include anionic reactive emulsifiers having a reactive group such as a propenyl group, an allyl group, an isopropenyl group, an acrylate group, or a methacrylate group, such as polyoxyethylene-1-(allyloxymethyl)alkyl ether sulfate ester ammonium salts (e.g., "AQUALON KH1025" manufactured by DKS Co., Ltd.), polyoxyethylene nonylpropenyl ether sulfate ester salts (e.g., "AQUALON HS1025" and "AQUALON BC-10" manufactured by DKS Co., Ltd.), polyoxyethylene allylglycidylnonylphenyl ether sulfate ester salts (e.g., "ADEKA REASOAP SE" manufactured by ADEKA Corporation), sodium alkylallylsulfosuccinate (e.g., "ELEMINOL JS-2" manufactured by Sanyo Chemical Industries, Ltd.), methacrylic acid polyoxyalkylene sulfate ester salts (e.g., "ELEMINOL RS-30" manufactured by Sanyo Chemical Industries, Ltd.), bis(polyoxyethylene polycyclic phenyl ether) methacrylate sulfate ester salts (e.g., "Antox MS-60"

manufactured by Nippon Nyukazai Co., Ltd.), ethylene glycol methacrylate sulfate ester salts (e.g., "Antox MS-2N" and "Antox MS-NH4" manufactured by Nippon Nyukazai Co., Ltd.), and those having other structures (e.g., "LATEMUL" manufactured by Kao Corporation, "NEW FRONTIER" manufactured by DKS Co., Ltd., and "RA-1823" and "RA-2320" manufactured by Nippon Nyukazai Co., Ltd.); and nonionic reactive emulsifiers having a reactive group such as a propenyl group, an allyl group, an isopropenyl group, an acrylate group, or a methacrylate group, such as polyoxyethylene nonylpropenyl ether (e.g., "AQUALON RN" manufactured by DKS Co., Ltd.), polyoxyethylene allylglycidylnonylphenyl ether (e.g., "ADEKA REASOAP NE" manufactured by ADEKA Corporation), polyoxyalkylene glycol monoacrylate (e.g., "BLEMMER AET" and "BLEMMER APT" manufactured by NOF Corporation), lauroxy polyethylene glycol monoacrylate (e.g., "BLEMMER ALE" manufactured by NOF Corporation), lauroxy polyethylene glycol monomethacrylate (e.g., "BLEMMER PLE" manufactured by NOF Corporation), stearoxy polyethylene glycol monomethacrylate (e.g., "BLEMMER PSE" manufactured by NOF Corporation), stearoxy polyethylene glycol-polypropylene glycol monoacrylate (e.g., "BLEMMER ASEP" manufactured by NOF Corporation), allyloxy polyalkylene glycol monomethacrylate (e.g., "BLEMMER PNEP" and "BLEMMER PNPE" manufactured by NOF Corporation), nonylphenoxy polyoxyalkylene glycol monoacrylate (e.g., "BLEMMER 43ANEP-500" and "BLEMMER 70ANEP-550" manufactured by NOF Corporation), polyethylene glycol-polypropylene glycol polyethylene glycol dimethacrylate (e.g., "BLEMMER 80PDC" manufactured by NOF Corporation), and polyethylene glycol polypropylene glycol-polyethylene glycol diacrylate (e.g., "BLEMMER 30ADC" manufactured by NOF Corporation).

The amount of reactive surfactant used is preferably 0.1 to 20 parts by mass, more preferably 0.3 to 15 parts by mass, still more preferably 0.5 to 10 parts by mass, relative to 100 parts by mass of the vinyl monomer.

<Hydroxy Group at End of Vinyl Polymer Chain>

In the fine resin particles of the present invention, the vinyl polymer chain may be terminated with a hydroxy group derived from a polymerization initiator.

Such fine resin particles can be obtained by using a polymerization initiator containing a hydroxy group in polymerizing the vinyl monomer.

The polymerization initiator containing a hydroxy group is preferably, for example, an azo polymerization initiator containing a hydroxy group.

Examples of the azo polymerization initiator containing a hydroxy group include 2,2'-azobis[2-methyl-N-(2-hydroxyethyl)propionamide] (trade name "VA-086"), 2,2'-azobis{2-methyl-N-[1,1-bis(hydroxymethyl)-2-hydroxyethyl]propionamide} (trade name "VA-080"), 2,2'-azobis{2-methyl-N-[1,1-bis(hydroxymethyl)ethyl]propionamide}(trade name "VA-082"), and 2,2'-azobis{2-methyl-N-[2-(1-hydroxybutyl)]-propionamide} (trade name "VA-085") (all manufactured by FUJIFILM Wako Pure Chemical Corporation). These azo polymerization initiators containing a hydroxy group may be used alone or in combination of two or more.

The amount of polymerization initiator used is preferably 0.1 to 2 parts by mass, more preferably 0.2 to 1 part by mass, still more preferably 0.3 to 0.8 parts by mass, relative to 100 parts by mass of the vinyl monomer.

<Physical Properties of Fine Resin Particles>

(Volume-Average Particle Size and its Coefficient of Variation)

The volume-average particle size of the fine resin particles of the present invention is not particularly limited and appropriately set according to the purpose or use. The volume-average particle size is preferably 10 to 1000 nm, more preferably 30 to 750 nm, still more preferably 50 to 500 nm.

The coefficient of variation of the volume-average particle size of the fine resin particles of the present invention is not particularly limited. The coefficient of variation is preferably 25% or less, more preferably 23% or less, still more preferably 21% or less.

The coefficient of variation (CV value) of the volume-average particle size of the fine resin particles is calculated from the following formula.

Coefficient of variation of volume-average particle size of fine resin particles=[(standard deviation of volumetric particle size distribution of fine resin particles)/(volume-average particle size of fine resin particles)]×100

(Amount of Residual Surfactant)

In the fine resin particles of the present invention, the amount of residual surfactant relative to 100 parts by mass of the fine resin particles is not particularly limited and appropriately set according to the purpose or use. The amount of residual surfactant is preferably 0.01 to 1 part by mass, more preferably 0.03 to 0.7 parts by mass, still more preferably 0.05 to 0.5 parts by mass. In the case where a surfactant is used during the polymerization, setting the amount of residual surfactant to less than 0.01 parts by mass may complicate the process and may be disadvantageous in terms of, for example, cost. If the amount of residual surfactant is 1 part by mass or more, foaming may occur when the fine resin particles are dispersed in a medium.

The amount of residual surfactant in the present invention can be determined, for example, as follows.

The fine resin particles are extracted with a solvent and measured using a liquid chromatography linear ion trap mass spectrometer (LC/MS/MS apparatuses).

As the LC/MS/MS apparatuses, "UHPLC ACCELA" manufactured by Thermo Fisher Scientific and "Linear Ion Trap LC/MSn LXQ" manufactured by Thermo Fisher Scientific can be used.

The content of the surfactant is measured by the method described below.

After about 0.01 g of the fine resin particles is accurately weighed into a centrifuge tube, an extract is added by injection, and the fine resin particles and the extract are mixed well. After ultrasonic extraction is performed, the mixture is mixed again and centrifuged, and the resulting supernatant is filtered to obtain a test liquid.

The concentration of the surfactant in the test liquid is determined from a calibration curve constructed in advance on the basis of peak area values on a chromatogram obtained using the LC/MS/MS apparatuses. From the measured surfactant concentration in the test liquid, the weight of the fine resin particles used as a sample (sample weight), and the extract amount, the content of the surfactant in the fine resin particles is determined by the following calculation formula.

Content of surfactant=surfactant concentration in test liquid×extract amount÷sample weight The calibration curve is constructed as follows.

An intermediate standard solution (methanol solution) of the surfactant at about 1000 ppm is prepared and then further diluted stepwise with methanol to prepare standard solutions for calibration curve construction at 20 ppm, 10 ppm, 5 ppm, and 2.5 ppm. The standard solution for calibration curve construction at each concentration is measured under the following conditions to obtain peak area values on a chromatogram of monitoring ions at m/z=730 to 830. Each concentration and the area values are plotted, and an approximate curve (quadric curve) is determined by the least-squares method and used as a calibration curve for quantification.

(Solvent Dispersibility)

The solvent dispersibility of the fine resin particles of the present invention is evaluated as good when the solvent resistance index described above is 50 or less. A solvent resistance index of 50 or less means that the change in volume-average particle size of the fine resin particles after heating is small, which means that the fine resin particles are not swollen and are dispersed without being aggregated in a solvent.

(Number-Average Particle Size)

The number-average particle size of the fine resin particles of the present invention is not particularly limited and appropriately set according to the purpose or use. The number-average particle size is preferably 10 to 1000 nm, more preferably 30 to 750 nm, still more preferably 50 to 350 nm.

(Monodispersity)

The monodispersity of the fine resin particles of the present invention is not particularly limited and appropriately set according to the purpose or use. The monodispersity is preferably 1.2 or less, more preferably 1.15 or less, still more preferably 1.12 or less.

The monodispersity is calculated from the following formula.

Monodispersity=(volume-average particle size of fine resin particles)/(number-average particle size of fine resin particles)

<Other Components>

The fine resin particles of the present invention may contain additives such as plasticizers, anti-bonding agents, air-bubble regulators, cross-linking agents, fillers, lubricants, colorants, fusion accelerators, spreaders, antioxidants, flame retardants, and flame retardant aids, to the extent that the advantageous effects of the present invention are not impaired.

[Method for Producing Fine Resin Particles]

The fine resin particles can be produced by polymerizing a vinyl monomer optionally in the presence of a polymerization initiator and a surfactant (emulsifier).

<Polymerization Initiator>

The polymerization initiator used in the polymerization of the fine resin particles of the present invention is not particularly limited, but it is preferable to use a thermally degradable water-soluble polymerization initiator. Examples of the thermally degradable water-soluble polymerization initiator include persulfates such as ammonium persulfate, potassium persulfate, and sodium persulfate; and azo compounds such as 2,2'-azobis[2-methyl-N-(2-hydroxyethyl) propionamide] (trade name "VA-086"), 2,2'-azobis[2-(2-imidazolin-2-yl)propane] (trade name "VA-061"), 2,2'-azobis[2-(2-imidazolin-2-yl)propane] dihydrochloride (trade name "VA-044"), 2,2'-azobis[2-(2-imidazolin-2-yl) propane] disulfate dihydrate (trade name "VA-046B"), 2,2'-azobis(2-methylpropionamidine) dihydrochloride (trade name "V-50"), 2,2'-azobis[N-(2-carboxyethyl)-2-methylpropionamidine] hydrate (trade name "VA-057"), 4,4'-azobis (4-cyanovaleric acid) (trade name "V-501"), 2,2'-azobis{2-methyl-N-[1,1-bis(hydroxymethyl)-2-hydroxyethyl] propionamide} (trade name "VA-080"), 2,2'-azobis{2-methyl-N-[1,1-bis(hydroxymethyl)ethyl]propionamide} (trade name "VA-082"), 2,2'-azobis{2-methyl-N-[2-(1-hydroxybutyl)]-propionamide} (trade name "VA-085"), 2,2'-azobis (2-amidinopropane) dihydrochloride, 2,2'-azobis{2-[1-(2-hydroxyethyl)-2-imidazolin-2-yl]propane} dihydrochloride, 2,2'-azobis(1-imino-1-pyrrolidino-2-ethylpropane) dihydrochloride, 2,2'-azobis(1-imino-1-pyrrolidino-2-methylpropane) dihydrochloride, and 2,2'-azobis{2-methyl-N-[1,1-bis(hydroxymethyl)-2-hydroxyethyl] propionamide}. In particular, water-soluble azo polymerization initiators are preferred because they have little influence on the slurry pH after polymerization, and, furthermore, from the viewpoint of improving the dispersibility of the fine resin particles, those having a hydroxy group in their molecule and capable of incorporating the polymerization initiator-derived hydroxy group to an end of the vinyl polymer chain of the fine resin particles are preferred.

In the present invention, polymerization initiators other than water-soluble polymerization initiator can also be used. Examples of such a polymerization initiator include organic peroxides such as cumene hydroperoxide, di-tert-butyl peroxide, dicumyl peroxide, benzoyl peroxide, lauroyl peroxide, dimethylbis (tert-butylperoxy)hexane, dimethylbis(tert-butylperoxy)hexyne-3, bis (tert-butylperoxyisopropyl) benzene, bis(tert-butylperoxy)trimethylcyclohexane, butyl-bis(tert-butylperoxy) valerate, tert-butyl peroxy-2-ethylhexanoate, dibenzoyl peroxide, paramenthane hydroperoxide, and tert-butyl peroxybenzoate; and azo compounds such as 2,2'-azobisisobutyronitrile (2,2'-azobis(2-methyl-butyronitrile), 2,2'-azobis(2-isopropylbutyronitrile), 2,2'-azobis(2,3-dimethylbutyronitrile), 2,2'-azobis(2,4-dimethylbutyronitrile), 2,2'-azobis(2-methylcapronitrile), 2,2'-azobis(2,3,3-trimethylbutyronitrile), 2,2'-azobis(2,4,4-trimethylvaleronitrile), 2,2'-azobis(2,4-dimethylvaleronitrile), 2,2'-azobis(2,4-dimethyl-4-ethoxyvaleronitrile), 2,2'-azobis (2,4-dimethyl-4-n-butoxyvaleronitrile), 2,2'-azobis(4-methoxy-2,4-dimethylvaleronitrile), 2,2'-azobis[N-(2-propenyl)-2-methylpropionamide], 2,2'-azobis(N-butyl-2-methylpropionamide), 2,2'-azobis(N-cyclohexyl-2-methylpropionamide), 1,1'-azobis(1-acetoxy-1-phenylethane), 1,1'-azobis(cyclohexane-1-carbonitrile), dimethyl-2,2'-azobis (2-methylpropinate), dimethyl-2,2'-azobisisobutyrate, dimethyl-2,2'-azobis(2-methylpropinate), and 2-(carbamoylazo)isobutyronitrile.

Furthermore, redox initiators obtained by combining the above persulfate and organic peroxide polymerization initiators with reducing agents such as sodium sulfoxylate formaldehyde, sodium bisulfite, ammonium bisulfite, sodium thiosulfate, ammonium thiosulfate, hydrogen peroxide, sodium hydroxymethanesulfinate, L-ascorbic acid and salts thereof, cuprous salts, and ferrous salts may be used.

These polymerization initiators may be used alone or in combination of two or more. These polymerization initiators are used in an amount of preferably 0.1 to 2 parts by mass, more preferably 0.2 to 1 part by mass, still more preferably 0.3 to 0.8 parts by mass, relative to 100 parts by mass of the vinyl monomer.

<Surfactant>

The surfactant for producing the fine resin particles of the present invention is not particularly limited, but it is preferable to use a reactive surfactant.

Examples of anionic reactive surfactants include ELEMINOL (registered trademark) JS-20 and RS-3000 manufactured by Sanyo Chemical Industries, Ltd., AQUALON (registered trademark) KH-10, KH-1025, KH-05, HS-10, HS-1025, BC-0515, BC-10, BC-1025, BC-20, BC-2020, AR-1025, and AR-2025 manufactured by DKS Co., Ltd., LATEMUL (registered trademark) 5-120, S-180A, S-180, and PD-104 manufactured by Kao Corporation, and ADEKA REASOAP (registered trademark) SR-1025 and SE-10N manufactured by ADEKA Corporation.

Examples of nonionic reactive surfactants include alkyl ether surfactants (commercially available products thereof include ADEKA REASOAP ER-10, ER-20, ER-30, and ER-40 manufactured by ADEKA Corporation and LATEMUL PD-420, PD-430, and PD-450 manufactured by Kao Corporation); alkylphenyl ether or alkylphenyl ester surfactants (commercially available products thereof include AQUALON RN-10, RN-20, RN-30, RN-50, AN-10, AN-20, AN-30, and AN-5065 manufactured by DKS Co., Ltd. and ADEKA REASOAP NE-10, NE-20, NE-30, and NE-40 manufactured by ADEKA Corporation); and (meth)acrylate sulfate ester surfactants (commercially available products thereof include RMA-564, RMA-568, and RMA-1114 manufactured by Nippon Nyukazai Co., Ltd.).

Of these reactive surfactants, those having a polyoxyalkylene chain in their molecule are preferred from the viewpoint of, for example, the dispersibility and dispersion stability of the particles.

In the present invention, surfactants other than reactive surfactants can also be used. Such a surfactant may be an anionic surfactant, a cationic surfactant, a zwitterionic surfactant, or a nonionic surfactant.

Examples of the anionic surfactant include sodium oleate; fatty acid soaps such as castor oil potash soap; alkyl sulfate ester salts such as sodium lauryl sulfate and ammonium lauryl sulfate; alkylbenzene sulfonate salts such as sodium dodecylbenzene sulfonate; alkylnaphthalene sulfonate salts; alkane sulfonate salts; dialkyl sulfosuccinate salts; alkyl phosphate ester salts; naphthalene sulfonic acid-formalin condensates; polyoxyethylene alkylphenyl ether sulfate ester salts; and polyoxyethylene alkyl sulfate ester salts.

Examples of the nonionic surfactant include polyoxyethylene alkyl ether, polyoxyethylene alkylphenyl ether, polyoxyethylene fatty acid ester, sorbitan fatty acid ester, polyoxysorbitan fatty acid ester, polyoxyethylene alkylamine, glycerol fatty acid ester, and oxyethylene-oxypropylene block polymer.

Examples of the cationic surfactant include alkylamine salts such as laurylamine acetate and stearylamine acetate; and quaternary ammonium salts such as lauryltrimethylammonium chloride.

Examples of the zwitterionic surfactant include lauryldimethylamine oxide, phosphate ester surfactants, and phosphite ester surfactants.

These surfactants may be used alone or in combination of two or more. The type of surfactant used is appropriately selected and the amount thereof is appropriately adjusted in view of, for example, the particle size of fine resin particles to be obtained and the dispersion stability of the polymerizable monomer during the polymerization.

The amount of surfactant used is preferably 0.3 to 20 parts by mass, more preferably 0.5 to 15 parts by mass, still more preferably 0.7 to 10 parts by mass, relative to 100 parts by mass of the vinyl monomer.

<Medium>

The medium used in the polymerization may be an aqueous medium or a non-aqueous medium. In the present invention, it is preferable to use an aqueous medium. Examples of the aqueous medium include water (e.g., ion-exchanged water) and mixed solvents of water and water-soluble solvents (lower alcohols such as ethanol).

<Dispersant>

When an aqueous medium is used in the polymerization, a dispersant may be used to stabilize the dispersibility of droplets of the vinyl monomer and seed particles. Examples of such a dispersant include organic dispersants such as partially saponified polyvinyl alcohols, polyacrylate salts, polyvinylpyrrolidone, carboxymethylcellulose, and methylcellulose; and inorganic dispersants such as magnesium pyrophosphate, calcium pyrophosphate, calcium phosphate, calcium carbonate, magnesium phosphate, magnesium carbonate, and magnesium oxide. When an inorganic dispersant is used, it is preferable to use a surfactant in combination.

<Polymerization Method>

In producing the fine resin particles, the vinyl monomer may be polymerized by any known polymerization method. A polymerization initiator and a surfactant (emulsifier) are used as required. For example, a method such as seed polymerization, emulsion polymerization, or suspension polymerization may be used.

Seed polymerization is a method in which fine resin particles formed of a polymer of a vinyl monomer are used as seed particles, and the seed particles are allowed to absorb a vinyl monomer in an aqueous medium and the vinyl monomer is polymerized in the seed particles. In this method, by growing the seed particles, fine resin particles having a particle size larger than that of the original seed particles can be obtained.

Emulsion polymerization is a polymerization method in which an aqueous medium, a vinyl monomer that hardly dissolves in the medium, and a surfactant (emulsifier) are mixed, and a polymerization initiator soluble in the aqueous medium is added to the mixture to cause polymerization. Emulsion polymerization is characterized in that fine resin particles with little variation in particle size are provided.

Suspension polymerization is a polymerization method in which a vinyl monomer and an aqueous medium are mechanically stirred to polymerize the vinyl monomer while being suspended in the aqueous medium. Suspension polymerization is characterized in that fine resin particles having a small and relatively uniform particle size can be provided.

In the present invention, seed polymerization is most preferred.

(Seed Polymerization)

The method of polymerizing the vinyl monomer for obtaining seed particles used in the seed polymerization is not particularly limited, and dispersion polymerization, emulsion polymerization, soap-free emulsion polymerization (emulsion polymerization not using a surfactant serving as an emulsifier), seed polymerization, suspension polymerization, or the like can be used. To obtain fine resin particles having a substantially uniform particle size by seed polymerization, it is necessary to initially use seed particles having a substantially uniform particle size and grow the seed particles in a substantially uniform manner. The starting seed particles having a substantially uniform particle size can be produced by polymerizing the vinyl monomer by a polymerization method such as soap-free emulsion polymerization (emulsion polymerization not using a surfactant), polymerization using a reactive surfactant, or dispersion polymerization. The reactive surfactant is not particularly limited, but it is preferable to use a reactive surfactant having a polyoxyalkylene chain in a molecule thereof. Therefore, the polymerization method for obtaining seed particles by polymerizing the vinyl monomer is preferably emulsion polymerization, soap-free emulsion polymerization, seed polymerization, or dispersion polymerization.

Also in the polymerization for obtaining seed particles, a polymerization initiator is used as required. As the polymerization initiator, the above-described polymerization initiators can be used. The amount of polymerization initiator used is preferably in the range of 0.1 to 2 parts by mass relative to 100 parts by mass of the vinyl monomer used to obtain the seed particles. The weight-average molecular weight of seed particles to be obtained can be adjusted by varying the amount of polymerization initiator used.

In the polymerization for obtaining seed particles, a molecular weight modifier may be used to adjust the weight-average molecular weight of the seed particles to be obtained. Examples of the molecular weight modifier include mercaptans such as n-octyl mercaptan and tert-dodecyl mercaptan; α-methylstyrene dimer; terpenes such as γ-terpinene and dipentene; and halogenated hydrocarbons such as chloroform and carbon tetrachloride. By varying the amount of molecular weight modifier used, the weight-average molecular weight of the seed particles to be obtained can be adjusted.

The volume-average particle size of the seed particles can be appropriately adjusted according to the average particle size of the fine resin particles. Preferably, the volume-average particle size of the seed particles is 1 to 300 nm, and the average mass of the seed particles is 1 to 100 mg/100 particles. The shape of the seed particles may be, for example, perfectly spherical or elliptically spherical (oval).

In the seed polymerization, seed particles are first added to an emulsion containing a vinyl monomer and an aqueous medium. The emulsion can be prepared by a known method. For example, the emulsion can be obtained by adding the vinyl monomer to the aqueous medium and dispersing the vinyl monomer with a micro-emulsifying machine such as a homogenizer, a sonicator, or a nanomizer (registered trademark).

In the seed polymerization, it is preferable to use a surfactant in an amount of 0.3 to 15 parts by mass relative to 100 parts by mass of the vinyl monomer. As the surfactant, the above-described surfactants can be used. When the amount of surfactant used is smaller than the above range, the polymerization stability may be low. When the amount of surfactant used is larger than the above range, it is uneconomical in terms of cost.

The seed particles may be added to the emulsion as they are, or may be added to the emulsion in the form of a dispersion in an aqueous medium. After the seed particles are added to the emulsion, the vinyl monomer is absorbed into the seed particles. This absorption can be typically performed by stirring the emulsion at room temperature (about 25° C.) for 1 to 12 hours. To promote the absorption of the vinyl monomer into the seed particles, the emulsion may be heated to about 30° C. to 50° C.

The seed particles swell as they absorb the vinyl monomer. For the mixing ratio of the vinyl monomer and the seed particles, the amount of the vinyl monomer is preferably in the range of 1 to 100 parts by mass, more preferably in the range of 5 to 50 parts by mass, relative to 1 part by mass of the seed particles. If the mixing ratio of the vinyl monomer is smaller than the above range, the increase in particle size due to polymerization is small, thus resulting in low production efficiency. If the mixing ratio of the vinyl monomer is larger than the above range, the vinyl monomer is not completely absorbed into the seed particles and may independently undergo emulsion polymerization in the aqueous medium to produce unintended fine resin particles having an abnormal particle size. The end of the absorption of the vinyl monomer into the seed particles can be determined by confirming an increase in particle size through observation under a light microscope.

Next, the vinyl monomer absorbed into the seed particles is polymerized to thereby obtain a fine resin particle dispersion. The fine resin particle dispersion may also be obtained by repeating the step of allowing the seed particles to absorb the vinyl monomer and polymerizing the vinyl monomer several times.

When the vinyl monomer absorbed into the seed particles is polymerized, a polymerization initiator may be added as required. After the polymerization initiator is mixed with the vinyl monomer, the resulting mixture may be dispersed in an aqueous medium, or the polymerization initiator and the vinyl monomer may be dispersed in different aqueous media and then mixed. The diameter of droplets of the vinyl monomer present in the resulting emulsion is preferably smaller than the particle size of the seed particles because the vinyl monomer can be efficiently absorbed into the seed particles.

As the polymerization initiator, the above-described polymerization initiators can be used. The polymerization initiator is preferably used in an amount in the range of 0 to 3 parts by mass relative to 100 parts by mass of the vinyl monomer.

The polymerization temperature of the seed polymerization can be appropriately selected according to the type of vinyl monomer and the type of polymerization initiator used as required. For example, the polymerization temperature is 25° C. to 110° C., preferably 50° C. to 100° C.

The polymerization time of the seed polymerization can be appropriately selected according to the type of vinyl monomer and the type of polymerization initiator used as required. For example, the polymerization time is 1 to 12 hours.

The seed polymerization may be carried out in an atmosphere of a gas inert to the polymerization (e.g., nitrogen).

The seed polymerization is preferably carried out in a manner that the temperature is raised after the vinyl monomer and the polymerization initiator used as required have been completely absorbed into the seed particles.

In the seed polymerization, the above-described dispersant may be added to the polymerization reaction system as a dispersion stabilizer in order to improve the dispersion stability of the fine resin particles. The dispersion stabilizer is preferably polyvinyl alcohol or polyvinylpyrrolidone. The amount of dispersion stabilizer added is preferably in the range of 1 to 10 parts by mass relative to 100 parts by mass of the vinyl monomer.

To suppress the generation of emulsion polymerization products (fine resin particles having an excessively small particle size) in the aqueous medium during the polymerization reaction, a water-soluble polymerization inhibitor such as a nitrate such as sodium nitrite, a sulfite, a hydroquinone, an ascorbic acid, a water-soluble vitamin B, citric acid, or a polyphenol may be added to the aqueous medium. The amount of polymerization inhibitor added is in the range of, for example, 0.002 to 0.2 parts by mass relative to 100 parts by mass of the vinyl monomer.

A method for producing fine resin particles in a preferred embodiment of the present invention includes a first polymerization step of polymerizing a monomer emulsion containing a vinyl monomer, an aqueous medium, and a reactive surfactant having a polyoxyalkylene chain in a molecule thereof by using a water-soluble polymerization initiator to obtain seed particles, and a second polymerization step of allowing the seed particles to absorb another monomer emulsion containing a vinyl monomer, an aqueous medium, and a reactive surfactant having a polyoxyalkylene chain in a molecule thereof and then polymerizing the other monomer emulsion.

A method for producing fine resin particles in another preferred embodiment of the present invention includes a first seed particle polymerization step of polymerizing a monomer emulsion composed of a vinyl monomer, ion-exchanged water, and a surfactant such as a reactive surfactant having a polyoxyalkylene chain in a molecule thereof by using a water-soluble polymerization initiator, and a second polymerization step of allowing the seed particles to absorb another monomer emulsion composed of a vinyl monomer, ion-exchanged water, and a surfactant such as a reactive surfactant having a polyoxyalkylene chain in a molecule thereof by portionwise or dropwise addition and then polymerizing the other monomer emulsion, the first seed particle polymerization step and the second polymerization step being performed in one nitrogen-purged polymerization vessel.

<Drying, Disintegration, and Classification of Fine Resin Particles>

After completion of the polymerization, the fine resin particles are formed into a cake containing the aqueous medium (water-containing cake) by a method such as suction filtration, centrifugation, or pressure separation, optionally washed with water and/or a solvent, and then dried and optionally disintegrated and classified. Through these steps, the fine resin particles are isolated as dry powder.

The drying method is not particularly limited, and, for example, spray drying with a spray dryer, freeze drying, or drying by adhesion to a hot rotating drum such as a drum dryer can be used.

In the present invention, it is preferable to use a spray-drying step of spray drying the fine resin particles obtained in the second polymerization step under conditions of an inlet temperature of 80° C. to 220° C. and an outlet temperature of 50° C. to 100° C. to obtain an aggregate. The aggregate obtained is easy to handle.

In the present invention, it is preferable to include a disintegration step of disintegrating the aggregate obtained to disperse the fine resin particles. The fine resin particles dispersed by disintegration have good dispersibility in a solvent.

Furthermore, in the present invention, it is preferable to include a classification step of classifying the fine resin particles. For example, it is preferable to include at least one of a classification step of classifying the fine resin particles obtained in the second polymerization step and a classification step of classifying the fine resin particles obtained in the disintegration step. The classification can be performed by known means.

[Applications of Fine Resin Particles]

The fine resin particles of the present invention can be used in various applications. Examples include additives for light diffusion plates, antiblocking agents for various films, various film modifiers, spacers between very small parts of various electronic devices, pore-forming agents for various battery members, and core particles of conductive fine particles providing electrical connection.

The fine resin particles of the present invention can maintain a desired particle size without swelling even when a heating step is additionally performed after the resin fine particles are dispersed in a solvent for use.

EXAMPLES

Hereinafter, the present invention will be described in detail with reference to Examples and Comparative Examples, but the following Examples are merely illustrative of the present invention and are not intended to limit the present invention.

In Examples and Comparative Examples, fine resin particles obtained were evaluated as follows.

<Gel Fraction>

After fine resin particles are collected and accurately weighed to determine their weight (W₁g), the fine resin particles are immersed in 100 parts by mass of toluene, stirred under reflux at 130° C. for 24 hours, and then cooled. The resulting fine resin particle dispersion is centrifuged in a centrifuge at 18000 rpm for 30 minutes, and the supernatant is removed. The residue is dried with a vacuum dryer at 60° C. for 12 hours, and the weight ($W_2$g) of insoluble matter is measured. Furthermore, the gel fraction of the fine resin particles is determined by the formula $W_2/W_1 \times 100$.

<Solvent Resistance Index>

One part by mass of the fine resin particles and 50 parts by mass of toluene are placed in a 100 mL plastic container with a lid and stirred with a deaeration stirrer (manufactured by THINKY CORPORATION, planetary centrifugal mixer (atmospheric-pressure type) AR-100 (trade name: Awatori Rentaro AR-100 (THINKY MIXER (Non Vacuum) AR-100))) for 3 minutes, and "volume-average particle size in fine resin particle dispersion in toluene" is measured with a dynamic light scattering-based concentrated nanoparticle size distribution analyzer (manufactured by CORDOUAN Technologies, "VASCO"). The resulting fine resin particle dispersion in toluene is then placed in a glass flask equipped with a reflux condenser, refluxed at 130° C. for 24 hours, and cooled. For the resulting fine resin particle dispersion in toluene after heating, "volume-average particle size in fine resin particle dispersion in toluene after heating" is measured with the above particle size distribution analyzer, and a solvent resistance index is calculated by the following formula.

Solvent resistance index (%)=100×(volume-average particle size (nm) of fine resin particles after heating−volume-average particle size (nm) of fine resin particles)/volume-average particle size (nm) of fine resin particles <Solvent Resistance>

On the basis of the gel fraction and the solvent resistance index, the solvent resistance was evaluated according to the following criteria.

⊙: The gel fraction is 93% or more, and the solvent resistance index is 10 or less.

○: The gel fraction is 93% or more, and the solvent resistance index is more than 10 and 25 or less.

Δ: The gel fraction is 93% or more, and the solvent resistance index is more than 25 and 50 or less.

x: The gel fraction is less than 93%, and the solvent resistance index is more than 50.

<Solvent Dispersibility>

On the basis of the solvent resistance index described above, the dispersibility in a solvent was evaluated according to the following criteria.

○: The solvent resistance index is 50 or less.

x: The solvent resistance index is more than 50.

<Volume-Average Particle Size and Number-Average Particle Size>

The volume-average particle size and the number-average particle size of the fine resin particles were measured with a laser diffraction scattering-type particle size distribution analyzer (model number "LS230", manufactured by Beckman Coulter, Inc.). Specifically, 0.1 g of an aqueous fine resin particle dispersion (solids content: 20%) and 20 ml of a 2 mass % anionic surfactant solution were put into a test tube, and then dispersed using a test tube mixer (manufactured by AS ONE Corporation, "Test Tube Mixer TRIO HM-1N") and an ultrasonic cleaner (manufactured by AS ONE Corporation, "ULTRASONIC CLEANER VS-150") over 5 minutes to obtain a dispersion. While irradiating the dispersion with ultrasonic waves by using the laser diffraction scattering-type particle size distribution analyzer, the volume-average particle size and the number-average particle size of the fine resin particles in the dispersion were measured.

The conditions of the measurement with the laser diffraction scattering-type particle size distribution analyzer are as follows.

Medium=water
Refractive index of medium=1.333
Refractive index of solid=refractive index of fine resin particles
PIDS relative concentration: 40% to 55%

The optical model in the measurement was set according to the refractive index of the fine resin particles produced. When one type of monomer was used to produce fine resin particles, the refractive index of a homopolymer of the monomer was used as the refractive index of the fine resin particles. When a plurality of types of monomers were used to produce fine resin particles, the weighted average of refractive indices of homopolymers of the monomers, each refractive index being weighted by the amount of each monomer used, was used as the refractive index of the fine resin particles.

From the measurement results, a volumetric particle size distribution of the fine resin particles was obtained. The arithmetic mean of the volumetric particle size distribution was defined as the volume-average particle size of the fine resin particles.

<Amount of Residual Surfactant>

The content of the surfactant in fine resin particles was measured by extracting the fine resin particles with a solvent and using a liquid chromatography linear ion trap mass spectrometer (LC/MS/MS apparatuses).

For the measurement of the content of the surfactant in fine resin particles of Examples and Comparative Examples described later, "UHPLC ACCELA" manufactured by Thermo Fisher Scientific and "Linear Ion Trap LC/MSn LXQ" manufactured by Thermo Fisher Scientific were used as the LC/MS/MS apparatuses.

In the fine resin particles of Examples and Comparative Examples described later, AQUALON AR-1025 (pure content: 25%, manufactured by DKS Co., Ltd.) and AN-5065 (pure content: 65%, manufactured by DKS Co., Ltd.) were used as surfactants, and the content of the surfactant in the fine resin particles of Examples and Comparative Examples was measured by the method described below.

About 0.01 g of fine resin particles as a sample was accurately weighed into a centrifuge tube, and 5 mL of methanol as an extract was added by injection using a whole pipette. The fine resin particles and the extract were mixed well. After ultrasonic extraction was performed for 15 minutes, the mixture was mixed well again and centrifuged at 3,500 rpm for 60 minutes, and the resulting supernatant was filtered through a 0.20 μm GL Chromatodisc Syringe Filter for Hydrophobic Samples manufactured by GL Sciences Inc. to obtain a test liquid.

The concentration of the surfactants AR-1025 and AN-5065 in the test liquid was measured using the LC/MS/MS apparatuses. From the measured surfactant concentration (μg/mL) in the test liquid, the weight of the fine resin particles used as a sample (sample weight (g)), and the amount of extract (extract amount (mL)), the content (μg/g) of the surfactant in the fine resin particles was determined by the following calculation formula. The extract amount was 5 mL.

Content of surfactant(μg/g)=surfactant concentration (μg/mL) in test liquid×extract amount (mL)÷ sample weight (g)

The surfactant concentration was determined from a calibration curve constructed in advance on the basis of peak area values on a chromatogram obtained using the LC/MS/MS apparatuses.

The calibration curve was constructed as follows.

An intermediate standard solution (methanol solution) of the surfactant at about 1000 ppm was prepared and then further diluted stepwise with methanol to prepare standard solutions for calibration curve construction at 20 ppm, 10 ppm, 5 ppm, and 2.5 ppm. The standard solution for calibration curve construction at each concentration was measured under the following conditions to obtain peak area values on a chromatogram of monitoring ions at m/z=730 to 830. Each concentration and the area values were plotted, and an approximate curve (quadric curve) was determined by the least-squares method and used as a calibration curve for quantification.

The LC measurement conditions are as follows.
Measuring apparatus: UHPLC ACCELA (manufactured by Thermo Fisher Scientific)
Column: Hypersil GOLD C18, 1.9 μm (inner diameter: 2.1 mm, length: 100 mm) (manufactured by Thermo Fisher Scientific) Column temperature: 40° C.
Mobile phase: (A: 10 mM ammonium acetate/B: acetonitrile)
Mobile phase conditions:
  0 min=B concentration: 70%
  0→0.5 min=B concentration: 70%→80%
  0.5→1.5 min=B concentration: 80%
  1.5→1.6 min=B concentration: 80%→70%
  1.6→4 min=B concentration: 70%
Flow rate: 0.3 mL/min
Pump temperature: room temperature (25° C.)
Injection volume: 2 μL
Measurement time: 4 min The MS measurement conditions are as follows.
Measuring apparatus: Linear Ion Trap LC/MSn LXQ (manufactured by Thermo Fisher Scientific)
Ionization: (ESI/positive)
Sheath Gas: 45 arb
AUX Gas: 0 arb
Sweep Gas: 0 arb
I Spray Voltage: 4.0 kV
Capillary Temp: 350° C.
Capillary voltage: 25 V
Tube lens Voltage: 100 V
Monitoring Mass (m/z): AR-1025 (SIM=730 to 830), AN-5065 (SIM=730 to 830)

<Monodispersity>

The monodispersity of the fine resin particles was calculated by the following formula.

Monodispersity=(volume-average particle size of fine resin particles)/(number-average particle size of fine resin particles)

<Foamability Test>

Into a 200 ml beaker with a stirring bar placed at the bottom, 80 ml of ion-exchanged water was put. The fine resin particles of each of Examples and Comparative Examples in an amount of 0.8 g were floated on the water surface and stirred at 300 rpm for 30 minutes. The foamability on ion-exchanged water after the stirring was evaluated according to the following criteria.

Not foamed: No foaming was observed on the liquid surface after the foamability test.

Foamed: Foaming was observed on the liquid surface after the foamability test.

Example 1

In a polymerization vessel equipped with a stirrer, a thermometer, and a cooling mechanism, 320 parts by mass of ion-exchanged water and 0.08 parts by mass of a reactive surfactant AQUALON AR-1025 (manufactured by DKS Co., Ltd.) were mixed. In another vessel, 3.8 parts by mass of methyl methacrylate and 0.2 parts by mass of ethylene glycol dimethacrylate were mixed well, and the mixture was put into the polymerization vessel and stirred with a TK homomixer (manufactured by PRIMIX Corporation) at 8000 rpm for 10 minutes, thereby obtaining a monomer mixture solution. After nitrogen purging of the polymerization vessel was carried out for 5 minutes, the temperature was increased to 75° C., and when 75° C. was reached, a water-soluble polymerization initiator VA-086 (manufactured by FUJIFILM Wako Pure Chemical Corporation) dissolved in 10 parts by mass of ion-exchanged water was put into the polymerization vessel. The reaction was allowed to proceed for 1 hour to obtain a slurry (1).

Next, in a vessel different from the vessel previously used, 36 parts by mass of ion-exchanged water, 0.3 parts by mass of AQUALON AR-1025 (manufactured by DKS Co., Ltd.), and 0.03 parts by mass of a reactive surfactant AQUALON AN-5065 (manufactured by DKS Co., Ltd.) were mixed to obtain a surfactant solution. In yet another vessel, 22 parts by mass of methyl methacrylate, 6 parts by mass of styrene, and 8 parts by mass of ethylene glycol dimethacrylate were mixed well, and the mixture was put into the surfactant solution and stirred with a TK homomixer (manufactured by PRIMIX Corporation) at 8000 rpm for 10 minutes, thereby obtaining a monomer mixture solution (2).

The monomer mixture solution (2) was added in eight portions over 2 hours to the slurry (1) maintained at 75° C. in the polymerization vessel. Thereafter, the mixture was aged for 1 hour, heated to 100° C., held for 3 hours, and then cooled, thereby preparing a fine resin particle-containing slurry.

The fine resin particle-containing slurry was passed through a 400-Mesh nylon net to classify fine resin particles, thereby obtaining a classified fine resin particle slurry. The classified fine resin particle slurry was spray dried using a spray dryer (manufactured by Sakamoto Giken Co., Ltd., machine name: Spray Dryer, system: atomizer take-up system, model number: TRS-3WK) under the following apparatus conditions, thereby obtaining a fine resin particle aggregate.

<Apparatus Conditions of Spray Dryer>
Rate of feeding slurry containing fine resin particles: 25 mL/min
Revolution of atomizer: 12000 rpm
Airflow rate: 2 m³/min
Inlet temperature (the temperature of a fine resin particle-containing slurry inlet port which is provided in the spray dryer and through which a slurry containing fine resin particles is introduced while being sprayed): 150° C.
Outlet temperature (the temperature of a powder outlet which is provided in the spray dryer and through which an aggregate of fine vinyl resin particles is discharged): 70° C.

The fine resin particle aggregate obtained was disintegrated using a current jet mill (manufactured by Nisshin Engineering Inc., trade name: CJ-10, pulverization air pressure: 0.5 MPa), as a result of which target fine resin particles were obtained.

The fine resin particles obtained had a volume-average particle size of 212 nm, and its coefficient of variation was 19.3%. An evaluation was conducted according to the method of measuring a solvent resistance index; the volume-average particle size in a dispersion in toluene was 215 nm, the volume-average particle size in the dispersion in toluene after heating was 228 nm, and the solvent resistance index was 6. The amount of residual surfactant in the fine resin particles was measured and found to be 0.1 mass %. The gel fraction of the fine resin particles was measured and found to be 96%, confirming that the fine resin particles had solvent resistance. Furthermore, the fine resin particles were subjected to a foamability test, and no foaming was observed.

Examples 2 to 6 and Comparative Examples 1 and 2

Fine resin particles were obtained in the same manner as in Example 1 except that the conditions for producing the fine resin particles were as shown in Table 1. Various physical properties of the fine resin particles obtained are also shown in Table 1.

TABLE 1

| Component (parts by mass) | Example 1 | Example 2 | Example 3 | Example 4 | Example 5 | Example 6 | Comparative Example 1 | Comparative Example 2 |
|---|---|---|---|---|---|---|---|---|
| Ion-exchanged water (1) | 320 | 320 | 320 | 320 | 320 | 320 | 320 | 320 |
| AR-1025 | 0.08 | 4.8 | 0.16 | 0.02 | 4.8 | 0.08 | 0.08 | 0 |
| Sodium polyoxyethylene oleyl ether phosphate | 0 | 0 | 0 | 0 | 0 | 0 | 0 | 0.4 |
| MMA | 3.8 | 3.8 | 3.8 | 1.1 | 3.9 | 3.8 | 12 | 3.95 |
| EGDMA | 0.2 | 0.2 | 0.2 | 0.1 | 0.1 | 0.2 | 0 | 0.05 |
| Ion-exchanged water (2) | 10 | 10 | 10 | 10 | 10 | 10 | 10 | 10 |
| VA-086 | 0.2 | 0.2 | 0.2 | 0.2 | 0.2 | 0.2 | 0.2 | 0.2 |
| Ion-exchanged water (3) | 36 | 36 | 36 | 36 | 36 | 36 | 36 | 36 |
| AR-1025 | 0.3 | 0.3 | 0.3 | 0.3 | 0.3 | 0.3 | 0.3 | 0 |
| AN-5065 | 0.03 | 0.03 | 0.03 | 0.03 | 0.03 | 0.03 | 0.03 | 0 |
| Sodium polyoxyethylene oleyl ether phosphate | 0 | 0 | 0 | 0 | 0 | 0 | 0 | 0.4 |
| MMA | 22 | 22 | 30 | 23 | 28 | 0 | 14 | 29.5 |
| St | 6 | 6 | 0.5 | 5 | 6 | 0 | 6 | 6 |
| EGDMA | 8 | 8 | 0 | 10 | 2 | 36 | 8 | 0.5 |

TABLE 1-continued

| Component (parts by mass) | Example 1 | Example 2 | Example 3 | Example 4 | Example 5 | Example 6 | Comparative Example 1 | Comparative Example 2 |
|---|---|---|---|---|---|---|---|---|
| DVB | 0 | 0 | 5.5 | 0 | 0 | 0 | 0 | 0 |
| Gel fraction (%) | 96 | 97 | 97 | 98 | 95 | 98 | 73 | 91 |
| Volume-average particle size in dispersion in toluene (nm): X | 215 | 95 | 195 | 387 | 97 | 206 | 254 | 220 |
| Volume-average particle size in dispersion in toluene after heating (nm): Y | 228 | 110 | 197 | 399 | 142 | 208 | 516 | 398 |
| Solvent resistance index = 100 × (Y − X)/X | 6.0 | 15.8 | 1.0 | 3.1 | 46.4 | 1.0 | 103.1 | 80.9 |
| Solvent resistance | ◎ | ○ | ◎ | ◎ | Δ | ◎ | X | X |
| Solvent dispersibility | ○ | ○ | ○ | ○ | ○ | ○ | X | X |
| Volume-average particle size (nm) | 212 | 88 | 188 | 366 | 87 | 208 | 232 | 210 |
| Coefficient of variation (%) | 19.3 | 24.2 | 20.7 | 17.1 | 23.8 | 19.1 | 20.8 | 18.9 |
| Amount of residual surfactant (mass %) | 0.10 | 0.43 | 0.14 | 0.08 | 0.38 | 0.10 | 0.18 | 1.90 |
| Foamability test | Not foamed | Not foamed | Not foamed | Not foamed | Not foamed | Not foamed | Not foamed | Foamed |
| Number-average particle size (nm) | 192 | 80 | 172 | 331 | 80 | 191 | 212 | 198 |
| Monodispersity | 1.10 | 1.10 | 1.09 | 1.11 | 1.09 | 1.09 | 1.09 | 1.06 |

The names and abbreviations of compounds used in Examples and Comparative Examples are as follows.
AR-1025: anionic reactive surfactant having a polyoxyalkylene chain in a molecule thereof MMA: methyl methacrylate
EGDMA: ethylene glycol dimethacrylate
VA-086: water-soluble azo polymerization initiator (2,2'-azobis[2-methyl-N-(2-hydroxyethyl)propionamide])
AN-5065: nonionic reactive surfactant having a polyoxyalkylene chain in a molecule thereof
St: styrene
DVB: divinylbenzene

The invention claimed is:

1. Fine resin particles comprising a polymer of a mixture solution of a vinyl monomer and a monomer containing a reactive surfactant having a polyoxyalkylene chain in a molecule thereof,
wherein a volume-average particle size of the fine resin particles is 50 to 500 nm,
a gel fraction of the fine resin particles is 93% or more,
a solvent resistance index of the fine resin particles is 10 or less,
an amount of residual surfactant is 0.01 to 1 part by mass relative to 100 parts by mass of the fine resin particles,
a vinyl polymer chain of the fine resin particles is terminated with a hydroxy group derived from a polymerization initiator, and
the reactive surfactant having the polyoxyalkylene chain in a molecule thereof is a surfactant having, in a molecule thereof, a double bond that allows copolymerization with a monomer in a polymerization system and a polyoxyalkylene chain, and having a reactive group selected from the group consisting of a propenyl group, an allyl group, an isopropenyl group, an acrylate group, and a methacrylate group.

2. The fine resin particles according to claim 1, having a volume-average particle size whose coefficient of variation is 25% or less.

3. The fine resin particles according to claim 1, wherein the vinyl monomer includes a monofunctional (meth) acrylic monomer and/or a monofunctional aromatic vinyl monomer.

4. The fine resin particles according to claim 1, wherein the vinyl monomer includes a polyfunctional (meth) acrylic monomer and/or a polyfunctional aromatic vinyl monomer.

5. The fine resin particles according to claim 1, being used as an antiblocking agent for a resin film.

6. The fine resin particles according to claim 1, being used as an additive for a light diffusion plate.

7. The fine resin particles according to claim 1, being used as a spacer for an electronic device.

8. A method for producing the fine resin particles according to claim 1, comprising: a first polymerization step of polymerizing a monomer emulsion containing a vinyl monomer, an aqueous medium, and a reactive surfactant having a polyoxyalkylene chain in a molecule thereof by using a water-soluble polymerization initiator to obtain seed particles; and a second polymerization step of allowing the seed particles to absorb another monomer emulsion containing a vinyl monomer, an aqueous medium, and a reactive surfactant having a polyoxyalkylene chain in a molecule thereof and then polymerizing the other monomer emulsion.

9. The method for producing fine resin particles according to claim 8, wherein the vinyl monomers each include at least one selected from monofunctional (meth) acrylic monomers, monofunctional aromatic vinyl monomers, polyfunctional (meth) acrylic monomers, and polyfunctional aromatic vinyl monomers.

10. The method for producing fine resin particles according to claim 8, comprising a spray-drying step of spray drying the fine resin particles obtained in the second polymerization step under conditions of an inlet temperature of 80° C. to 220° C. and an outlet temperature of 50° C. to 100° C. to obtain an aggregate.

11. The method for producing fine resin particles according to claim 8, comprising a spray-drying step of spray drying the fine resin particles obtained in the second polymerization step under conditions of an inlet temperature of 80° C. to 220° C. and an outlet temperature of 50° C. to 100° C. to obtain an aggregate, and a disintegration step of disintegrating the aggregate to disperse the fine resin particles.

12. The method for producing fine resin particles according to claim 8, comprising a classification step of classifying the fine resin particles.

* * * * *